June 30, 1970  E. MITTERER  3,517,888
ELBOW COCK WITH SPRAY OUTLET NOZZLE FOR AGRICULTURAL
SPRAYING MACHINES Filed April 26, 1968  2 Sheets-Sheet 1

INVENTOR.
ERNESTO MITTERER

INVENTOR.
ERNESTO MITTERER

United States Patent Office 3,517,888
Patented June 30, 1970

3,517,888
ELBOW COCK WITH SPRAY OUTLET NOZZLE FOR AGRICULTURAL SPRAYING MACHINES
Ernesto Mitterer, Via Novale 14,
Terlano, Bolzano, Italy
Filed Apr. 26, 1968, Ser. No. 724,580
Claims priority, application Italy, Apr. 26, 1967, 2,011/67; Feb. 2, 1968, 2,509/68
Int. Cl. B05b 1/30
U.S. Cl. 239—579      2 Claims

ABSTRACT OF THE DISCLOSURE

An elbow cock having a rotatable valve cock in the outlet arm thereof, in which a nebulizer nozzle is mounted. The cock can be rotated in the tap body to adjust the volume of fluid discharged through the nozzle, and to this end is provided with a lateral opening near the bottom end thereof which can be turned with respect to a corresponding opening in the intake arm of the tap body between an open position, in full alignment therewith, and an offset, closed position. Intermediate positions give intermediate rates of flow.

SUMMARY OF THE INVENTION

The present invention relates to an elbow tap with associated spray outlet nozzle, for use in agricultural spraying machines. The primary object is to provide a new and improved form of elbow tap in which the volume of flow discharged through the spray nozzle is regulated by merely turning the plug projecting from the outlet arm of the tap, whereby the adjustment member is accessible from the discharge end of the tap. This is important in certain types of spray machines, where the nozzles are located in restricted passageways, as will be shown hereinafter.

Another object of the invention is to provide an elbow tap of the class described which is particularly adapted for use with high pressure fluids, such as agricultural sprays, which are often corrosive and frequently contain suspended particles which can clog conventional valves.

Other objects and advantages of the invention will appear from the following detailed description of the preferred embodiment thereof, taken with the drawings.

DESCRIPTION OF THE PREFERRED EMBODIMENT

Spray nozzles are used in trailer-drawn machines, called sprayers, or atomizers, for the disinfection of trees and vineyards by spraying in a laminar flow, in a cloud consisting of air blown from the machine together with a liquid nebulized under pressure from the nozzles of the machine.

Figure 1:
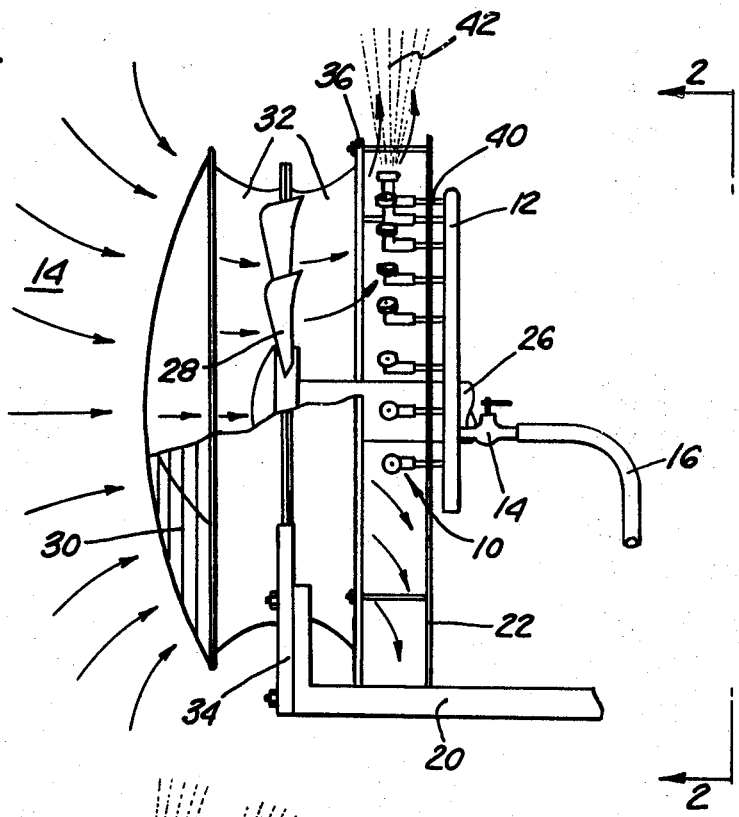
FIG. 1 is a partially cutaway side elevation of an agricultural sprayer, showing the location and arrangement of the elbow taps of the present invention.
Figure 2:
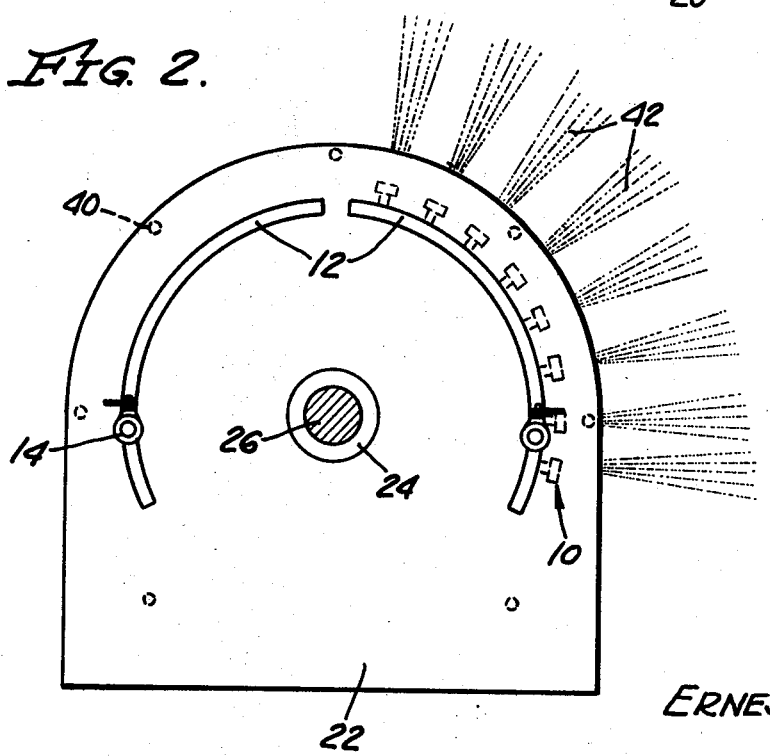
FIG. 2 is a rear elevation of the same, seen at 2—2 in FIG. 1.

In order to understand the purpose of the present invention it is first necessary to explain the designed arrangement of one of the known spraying machines of the type illustrated in FIGS. 1 and 2.

A crown of elbow taps 10 is connected to two tubular manifolds or distributors 12 in the form of an arc of a circle, which are, through a cutoff valve 14 and a flexible tube 16, each fed by a liquid used for spraying and supplied under high pressure from a pump (not shown) which is disposed in the rear part of the foundation frame 20 of the machine, said frame being mounted on a self-propelled or tractor-drawn truck (not shown).

Projecting inwardly from the frame 20 is a perpendicular plate 22 with a continuous wall and a central bearing 24, through which a shaft 26 passes. Shaft 26 is driven by a motor (not shown) of the machine, which also actuates said pump. Fixedly mounted on the free end of shaft 26 so as to rotate therewith is a bladed, axial-flow fan 28, which is shielded on the intake side by a protective grill 30.

An annular shroud 32 surrounds the fan 28 and is carried by a support 34 fastened to the foundation 20, which joins the grill 30 with a flanged ring 36. The base of ring 36 is fastened to the foundation 20, and the circumference of the ring is connected to plate 22 by means of tie rods 40.

Air sucked in by the fan 28 is conducted through shroud 32 toward the plate 22, which deflects the air radially outward, the air being simultaneously mixed with the nebulized liquid which also issues radially from the nozzles of taps 10, so that a laminar flow 42 of air and nebulized liquid issues from the annular opening between the flanged ring 36 and plate 22.

In machines of the type just described, which are in general use everywhere, the distributor arcs 12 must, for design reasons, be located on the side of the plate 22 that is inside the housing of the machine, i.e., on the righthand of said plate in FIG. 1. The jet from the nozzles 10 must, on the other hand, issue radially from the annular space or opening between plate 22 and the flanged ring 36. Therefore, such machines must have elbow taps, whose entrance arm must traverse plate 22 and whose exit arm, with its terminal nozzle, must be arranged radially in the annular opening between plate 22 and ring 36.

In the known elbow taps with terminal nozzles which have been used until now in spraying machines of the above-described type, it is the usual practice to insert a conventional regulating valve in one of the two arms of the elbow tap, said valve being usually of the straight-through type having a valve body and rotatable spindle actuated by a pressure screw. Valves of this type have three disadvantages: loses due to the high pressure of the liquid; corrosion and clogging, due to the chemical natures of the liquid; and inaccessibility of the actuating members of the valves, due to the narrowness of the annular opening 22, 36, in which these valves are disposed, the opening being in reality narrower than is shown in the drawing.

In order to eliminate the first two disadvantages, this invention replaces the spindle and pressure screw with a rotatable valve cock. In order to eliminate the third disadvantage, the invention proposes to bring the valve control member, that is, said rotatable cock, to the periphery of the annular opening 22, 36, so that, with the elbow tap according to the invention, the operator can grip said control member without having to insert his hand into said opening, as has heretofore been necessary with prior types.

The invention solves the problem by mounting the spray nozzle on a valve cock which is rotatably disposed within the exit arm of an elbow tap, with its axial passageway in free communication with said nozzle. The valve cock is equipped in the vicinity of its bottom end with a lateral aperture which, when the cock is mounted in the tap, is positioned at the level of the entrance arm of the latter. With this structural arrangement, the nozzle functions also as an adjustment member for actuating the valve cock of the elbow tap on which it is mounted, and regulation of the outflow of nebulized liquid from the nozzle is effected by rotating the nozzle without having to introduce the hand into the annular opening of the machine from which the flow of spray issues.

The valve cock of the elbow tap according to the invention must insure, at any angular position, particularly in a partially-open position, a perfect seal between the entrance and exit arms under high pressure of the incoming liquid, so as to obtain maximum precision in the regulation of the nebulized jet.

According to one development of the present invention, the valve cock is rotatably disposed within a ferrule made of resilient, corrosion-proof material and which presents toward one end, and in diametrically opposed positions, an aperture on one side, and a protruding full knob on the other. The ferrule is force-fitted into the bottom of the exit arm of the elbow cock to such a depth and in such angular position that its aperture registers with the entrance arm of the elbow cock, and that its full knob seats in a cavity facing said arm in the wall of the exit arm of the cock. Thus the cock will be fully open, partly open, or fully closed according to the respective angular positions of the lateral apertures of the ferrule and of the plug which, as it rotates, cannot entrain the ferrule by friction, the latter being held in place by its knob engaged in the cavity of the exit arm of the elbow cock.

According to a further development of the invention, the blocking of said ferrule in the installed position can be reinforced by arranging said lateral aperture of the ferrule within a knob projecting therefrom in a position diametrically opposite that of the full knob, and having an outside diameter at least equal to the diameter of the orifice of the entrance arm of the cock. Thus the ferrule will, in the installed position, be held on two ends of its diameter.

The elbow tap is designated in its entirety by the reference numeral 10, and its angular body consists of an elbow 44 which presents a rib 46, a threaded mouth 48 to be screwed onto one of the control plugs of a manifold 12 of a spraying machine of the type shown in FIGS. 1 and 2, an entrance arm 50 and an exit arm 52, with two diametrically opposite slots 54.

Into the bottom of arm 52 is forced a ferrule 56, which functions as seal packing of the valve cock of the tap in any angular position of the cock. The ferrule, which is made of a resilient and corrosion resistant material, presents, according to the invention, toward its lower end and in two diametrically opposite positions, on one side a pierced projecting knob 58 which has an outside diameter at least equal to the diameter of the orifice of arm 50, and on the opposite side a full projecting knob 60. When the ferrule is forced all the way into arm 52, knob 58 engages in the outlet orifice of entrance arm 50 and knob 60 engages in a cavity 62, of equal or smaller diameter, arranged toward the bottom of the inner wall 52 facing the outlet orifice of entrance arm 50. Thus, the two knobs 58 and 60 prevent the ferrule 56 from rotating in arm 52 when the cock lodged in that ferrule is rotated.

In the chamber 64 of ferrule 56 there is lodged rotatably a valve cock 66. The inner conduit 68 thereof can communicate with the conduit of arm 50 when its hole 70, as shown in FIG. 1, corresponds with hole 58 of the ferrule 56. The conduit 68 terminates in a truncated cone-shaped chamber 71, in which is housed a liquid nebulizer 72, of more-or-less conventional form, which need not be shown in detail herein. The chamber 70 is closable by a threaded cap 74, which presents a rim of peripheral ribs 76 and a hole 78 on the cover matching the central hole of the nebulizer, for issuance of the jet of nebulized liquid. On the outer wall of chamber 76 are provided two fins 80 and 82, which limit the rotation of the cock, either of them striking against wing 46 of the tap body.

The seal of cock 66 towards the exterior is ensured by a resilient annular packing 84, lodged in a corresponding annular groove in the cock. The latter is axially secured in the conduit of arm 52 of the tap body by a forked pin 86 which, embracing the cock on its outer annular groove 88 and engaging with its branches in the two opposite slots 54 of the tap body, secure the cock to the latter in a rotatable but not axially slidable manner.

Figure 3:
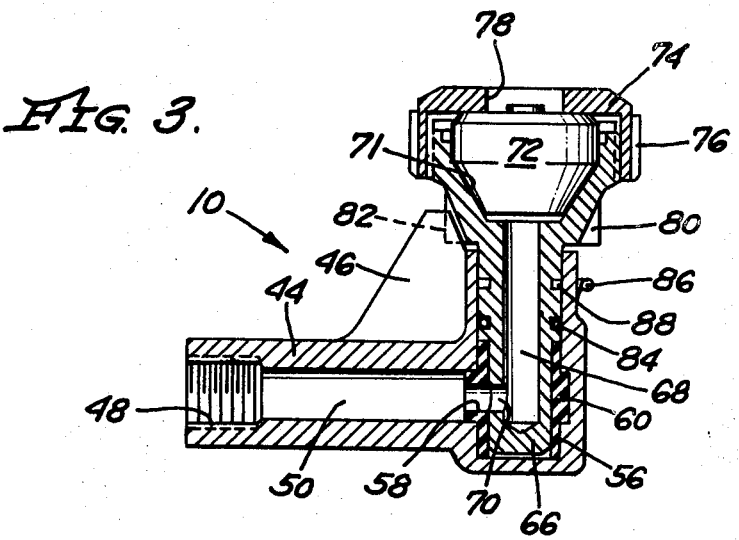
FIG. 3 is an enlarged longitudinal axial section of the elbow tap of the invention, with a nozzle according to the invention.
Figure 4:
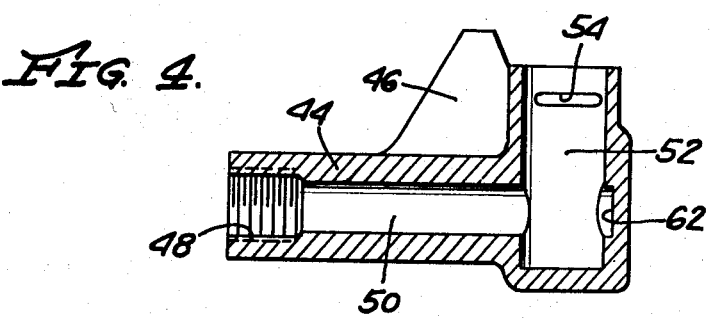
FIG. 4 is a similar longitudinal axial section of the elbow tap body, by itself.
Figure 5:
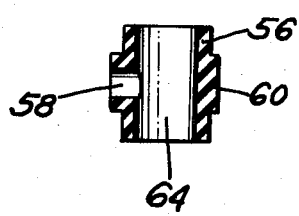
FIG. 5 is a similar view of the ferrule, which goes inside the tap body.

After the cap 74 has been screwed home on chamber 71 and blocked, the cap, gripped by its peripheral ribs 76, serves to rotate cock 66 from the open position shown in FIG. 3, in which the conduit of arm 50 of the tap body communicates with conduit 68 of the cock through hole 70 thereof coinciding with hole 58 of ferrule 56, and fin 82 strikes against wing 46, to an opposite position in which fin 80 strikes against wing 46 and hole 58 is closed by the full wall of cock 66.

While I have shown and described in considerable detail what I believe to be the preferred form of my invention, it will be understood by those skilled in the art that various changes may be made.

What is claimed is:

1. An elbow tap with nebulizer outlet for agricultural spraying machines, characterized by the fact that a nebulizer nozzle (72) is rotatable on the end of an exit arm (52) of an elbow tap (10) and is coaxially integral with a cock (66) mounted rotatably in said exit arm with its axial conduit (68) in free coaxial communication with the chamber (71) of said nozzle, said cock being equipped near its bottom end with a lateral aperture (70), which, when the cock is mounted in the tap, is positioned at the level of the entrance arm (50) of the latter, the cock (66) is lodged rotatably within a ferrule (56) of resilient and corrosion-proof material, which ferrule presents toward one end and in diametrically opposite positions an aperture (58) on one side and a projecting knob (60) on the other, said ferrule being forced into the bottom of the exit arm (52) of the tap to such a depth and in such an angular position that its aperture (58) comes to register with the entrance arm (50) of the tap, and that its full knob (60) engages in a cavity (62) provided facing the arm (50) in the wall of the arm (52).

2. An elbow tap according to claim 1, characterized by the fact that the hole (58) of the ferrule (56) is arranged in a knob projecting from said ferrule and of an outside diameter greater than or equal to the diameter of the orifice of the entrance arm (50) of the tap, said knob engaging in the orifice when the ferrule (56) is forced into the installed position.

References Cited

UNITED STATES PATENTS

| | | | |
|---|---|---|---|
| 1,218,879 | 3/1917 | Luzzi | 239—579 |
| 2,938,672 | 5/1960 | Glatfelter | 239—77 |
| 1,883,264 | 10/1932 | Wright | 239—579 |
| 3,369,754 | 2/1968 | Wolford | 239—78 |

EVERETT W. KIRBY, Primary Examiner

U.S. Cl. X.R.

239—77